United States Patent
Dreyer et al.

(10) Patent No.: US 6,838,024 B1
(45) Date of Patent: Jan. 4, 2005

(54) METHOD FOR MAKING CARBON BLOCKS HIGHLY RESISTANT TO THERMAL SHOCK

(75) Inventors: Christian Dreyer, St. Jean de Maurienne (FR); Bernard Samanos, St. Jean de Maurienne (FR)

(73) Assignees: Aluminium Pechiney, Paris Cedex (FR); FCB Aluminium, Givors (FR)

(*) Notice: Subject to any disclaimer, the term of this patent is extended or adjusted under 35 U.S.C. 154(b) by 340 days.

(21) Appl. No.: 10/111,400
(22) PCT Filed: Nov. 21, 2000
(86) PCT No.: PCT/FR00/03226
§ 371 (c)(1), (2), (4) Date: May 6, 2002
(87) PCT Pub. No.: WO01/38253
PCT Pub. Date: May 31, 2001

(30) Foreign Application Priority Data

Nov. 24, 1999 (FR) .................................. 99 14800

(51) Int. Cl.⁷ .......................... B29B 9/00; B29B 11/14; C01B 31/00; H01M 4/58
(52) U.S. Cl. .................. 264/29.1; 264/37.1; 264/37.29; 264/69; 264/115; 264/118; 264/122; 429/231.8
(58) Field of Search .............. 264/29.1, 109, 264/125, 123, 69, 37.1, 37.29, 115, 118, 122; 429/231.8

(56) References Cited

U.S. PATENT DOCUMENTS 4,479,913 A * 10/1984 Akerberg et al. .......... 264/29.5
4,775,455 A * 10/1988 Chandramouli et al. .... 204/294
5,299,745 A    4/1994 Fischer
5,413,689 A *  5/1995 de Nora et al. ............. 204/279

FOREIGN PATENT DOCUMENTS

AU   12415/97   8/1998
DE   3540169    5/1987
SU   1281604    1/1987

* cited by examiner

Primary Examiner—Stephen J. Lechert, Jr.
(74) Attorney, Agent, or Firm—Dennison, Schultz, Dougherty & MacDonald (57) ABSTRACT

The invention relates to a simplified production process with which it is possible to obtain carbon blocks, in particular anodes intended for aluminium production using the Hall-Héroult electrolysis process, which have high thermal shock resistance. This process comprises a grain size distribution adjustment operation of a carbon aggregate which includes:

a) separating an initial ungraded carbon aggregate AC into a first fraction F1 made up of grains whose sizes are smaller than X, and into a second fraction F2 made up of grains whose sizes are X or greater, X lying between 0.2 and 2 mm;

b) crushing B1 the first fraction F1 and part P1 of the second fraction F2 such as to obtain a powder F comprising a controlled proportion of ultra-fine grains;

c) mixing the remaining part P2 of fraction F2 and said powder F in proportions with which it is possible to obtain crude carbon blocks whose so-called "Gr/S" ratio between the proportion PGr of grains larger than 0.3 mm and the proportion PS of grains between 30 μm and 0.3 mm in size is at least equal to 4 and baked carbon blocks of high density.

22 Claims, 6 Drawing Sheets

METHOD FOR MAKING CARBON BLOCKS HIGHLY RESISTANT TO THERMAL SHOCK

This application is a filing under 35 U.S.C. 371 of PCT/FR00/03226, filed Nov. 21, 2000.

FIELD OF THE INVENTION

The invention relates to a process for producing carbon blocks with high thermal shock resistance, in particular anodes intended for aluminium production by electrolytic smelting of alumina dissolved in a melted cryolite bath, according to the Hall-Héroult process.

DESCRIPTION OF RELATED ART

In general, carbon products are obtained by industrial processes comprising a mixing operation of a binder (such as pitch) with carbonaceous material (such as coke), a hot-forming operation of the mixture, and a baking operation of the crude products. The binder and carbon material are mixed in powder form, that is to say using crushed material of determined grain size distribution. In practice, the mixing operation uses several size fractions, so-called "industrial" fractions, of carbon material stored in separate silos, and pitch.

In many industrial applications, in particular in electrometallurgy, the baked carbon products must, in addition to their heat and electric conducting properties, offer high resistance to thermal shock.

In particular, regarding aluminium production by electrolysis of alumina in a melted cryolite bath, the carbon anodes form a consumable product which is replaced in the electrolytic cell as and when it is consumed by combustion. Typically, a modern electrolysis plant producing 240 000 tonnes of aluminium per year for example, simultaneously consumes 150 000 anodes, whose unit weight is in the region of one tonne.

However, during replacement operations of spent anodes by new pre-baked anodes, the latter—which are generally at a temperature close to ambient temperature—are added to the melted electrolyte bath which is maintained at a temperature close to 950° C. The thermal shock due to the sudden increase in temperature may cause cracking, even breakage of the anodes. In general, the degradation of anode quality due to thermal shock leads to the onset and development of cracks, and quickly leads to loss of metal production or operating instabilities of the cells due to the breakaway of carbon pieces from the cracked anodes, which fall into the electrolysis bath.

The additional operating costs generated by lack of resistance to thermal shock rapidly increase with the percentage of rejected, cracked anodes due to thermal shock. It therefore becomes of essential importance to ensure good anode resistance to thermal shock before they are placed in service. A rejection rate of less than 1% is considered acceptable but soon becomes intolerable over and above 2%.

Patent application FR 2 740 771 (equivalent to Canadian patent CA 2 192 707 and to Australian patent AU 12415/97) on behalf of the applicant, describes d method of producing carbon blocks, anodes in particular, having high resistance to thermal shock. This method successively comprises size adjustment of a carbon aggregate by crushing and size gradation, mixing generally at a temperature of between 130° C. and 180° C. of the crushed aggregate with a predetermined quantity of pitch binder to form a homogeneous paste, densifying by compaction, forming said paste into a carbon block in the crude state, and finally baking the carbon block at a temperature that is generally greater than 900° C. Adjustment of aggregate size is made in accordance with three fractions: ultra-fine (UF) for grains having a diameter of less than 30 μm, sand (S) for grains with a diameter of between 30 and 300 μm, and grain (Gr) for grains having a diameter greater than 300 μm. The weight ratio of the Gr and S fractions is adjusted so that Gr/S is greater than 4. With this process it is possible to reduce very significantly the rejection rate of carbon blocks which have cracked due to thermal shock.

Figure 1:
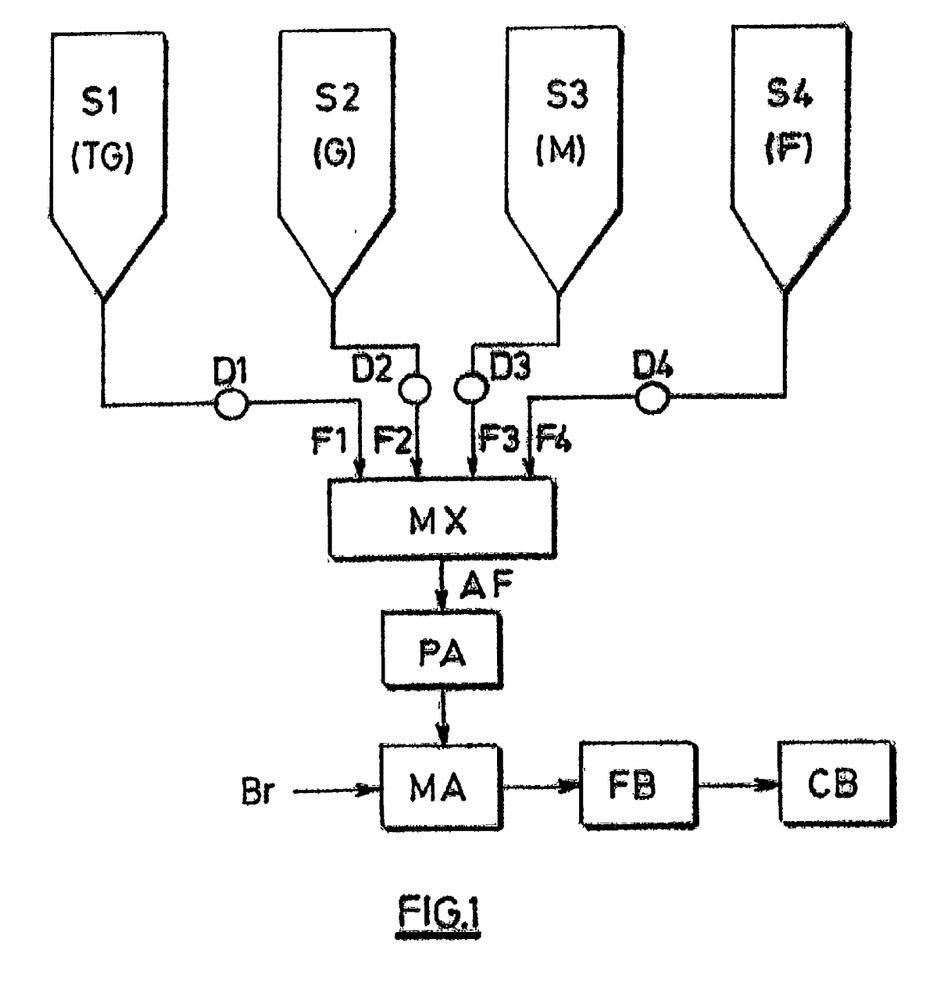
FIG. 1 illustrates part of the production process of carbon blocks according to the prior art, in which the initial dry material is stored in separate silos according to grain size distribution and composition.

As described in application FR 2 740 771, the three fractions are obtained in practice by mixing several industrial size fractions of dry material derived from separate silos (typically 3 to 5 silos). For example, as illustrated in FIG. 1, this application describes the use of 4 industrial fractions, namely:

TG (Very Large) formed of grains from recycled matter with a diameter of between 1.5 mm and 15 mm obtained by crushing production-inherent waste such as stubs of spent anodes;

G (Large) formed of coke grains with a diameter of between 1.5 mm and 5 mm and made up of coke grains in the higher size grade after 1.5 mm screening;

M (Medium) formed of coke and recycled grains having a diameter of between 0 and 1.5 mm and made up of size fractions smaller than 1.5 mm of coke and recycled grains;

F (Fines) formed of fines with a diameter of less than 0.2 mm and made up of the fraction of mediums M refined by grinding. This fraction of fines must contain a sufficient proportion of ultra-fines UF with a diameter of less than 0.03 mm.

These theoretical and industrial grain size distribution fractions overlap in accordance with a known diagram. Therefore grain Gr is provided by very large TG, large G and part of M; sand S and ultra-fines UF are provided by part of M and of F. Precise proportions of each fraction (F1, F2, F3 and F4) must be mixed in order to obtain a final carbon aggregate AF having the desired final grain size distribution. These proportions are adjusted using proportioners D1, D2, D3, D4 connected to silos S1, S2, S3, S4 containing the different grain size distribution fractions. The powder mixture obtained AF is then generally pre-heated (step PA), mixed with a pitch binder Br in a mixer (step MA), formed (step FB) and baked at high temperature (step CB).

This, relatively complex, process requires strict management of raw material stocks, of dry material flows and of silo reserves, and possibly the addition of an intermediate crushing operation of material derived from some silos.

The applicant has sought an industrial production process for carbon blocks of large size (that is to say whose volume is typically greater than 0.2 m³) having high thermal shock resistance, with which it is possible to avoid the disadvantages of the prior art. In particular, the applicant set out to find means for reducing the scale and costs of the required installations and for simplifying the production process, operating modes, stock management and flows of materials.

SUMMARY OF THE INVENTION

The production process for carbon blocks, anodes in particular, according to the invention comprises the supply of an initial carbon aggregate AC, size adjustment of said carbon aggregate AC in order to obtain a final carbon aggregate FA of determined grain size distribution Gf, hot mixing Me of the final carbon aggregate FA with a determined quantity of pitch binder Br to form a homogeneous paste, a forming step FB to form at least one crude carbon block from said paste, and a baking step CB for the crude carbon block or blocks, and is characterized in that said adjustment comprises:

a) separating the initial carbon aggregate AC into a first fraction F1 of grain size distribution G-formed of grains whose sizes are less than X, and into a second fraction F2 of grain size distribution G+made up of grains whose sizes are greater than or equal to X, X lying between 0.2 and 2 mm, and preferably lying between 0.3 and 1 mm, said carbon aggregate AC preferably containing calcined petroleum coke whose percentage of particles smaller than 0.3 mm is no more than 35%;

b) grinding B1 the first, fraction F1 and part P1 of the second fraction F2, so-called "diverted part P1", in such manner as to obtain a powder F containing a controlled proportion PUF of ultra-fine grains, called UF, that is to say grains whose sizes are less than 30 $\mu$m;

c) mixing MX the remaining part P2 of fraction F2 and said powder F in proportions enabling carbon blocks to be obtained whose grain size distribution Gf in the crude state is such that the so-called "Gr/S" ratio between the proportion PGr of grains larger than 0.3 mm and the proportion PS of grains between 30 mm and 0.3 mm in size is at least equal to 4, and whose density after baking is high, that is to say preferably greater than 1.55, further preferably greater than 1.6.

With the presence of ultra-fine grains it is possible to increase the density of the carbon blocks. The proportion PUF of ultra-fine grains in powder F is a parameter of the process of the invention which is empirically adjusted so as to reach the highest possible density. The PUF proportion is generally greater than 70%, preferably greater than 80%, and further preferably greater than 90%.

The applicant found, in surprising manner, that it is possible to obtain a PGr/PS ratio (also called "Gr/S" ratio) able to assure sufficient resistance to thermal shock without having recourse to the complicated processes set forth in the prior art. In particular, according to the invention, the mixture MX of carbon products is made from only two sources of powdered carbon material, namely P2 and F. With the process of the invention, it is also possible to adjust the Gr/S ratio and anode density easily and simultaneously.

The carbon aggregates AC used as raw material for the process of the invention, which are preferably ungraded aggregates, may contain considerable proportions of grains less than 0.3 mm in size. The separating operation of the initial carbon aggregate AC into two fractions and the crushing operation of the first fraction make it possible to increase significantly the Gr/S ratio, even using coke whose percentage of grains smaller than 0.3 mm is as high as 35%. However, in order to obtain a Gr/S ratio greater than 4, it is preferable to use carbon aggregates whose proportion of grains smaller than 0.3 mm in size is less than 15%, even less than 10%.

The initial carbon aggregate AC may be formed of carbon aggregates derived from several sources. In particular, the initial carbon aggregate AC may contain a determined proportion of recycled carbon products R. For example, in the aluminium production industry, it is advantageous for economical and technical reasons, to add a proportion of recycled carbon products which may reach as high as 40% and derived in particular from spent or rejected anodes before or after baking. These products also offer the advantage of containing, in general, a high proportion of very large or large grains in relation to sand or fine grains. Therefore, the initial carbon aggregate AC may typically be made up of a mixture of ungraded calcined petroleum coke C and a minority part of recycled carbon product R

BRIEF DESCRIPTION OF THE DRAWINGS

The invention will be better understood with reference to the figures and detailed description given below.

FIGS. 3 to 6 illustrate preferred embodiments of the process of the invention.

DETAILED DESCRIPTION OF THE INVENTION

Figure 2:
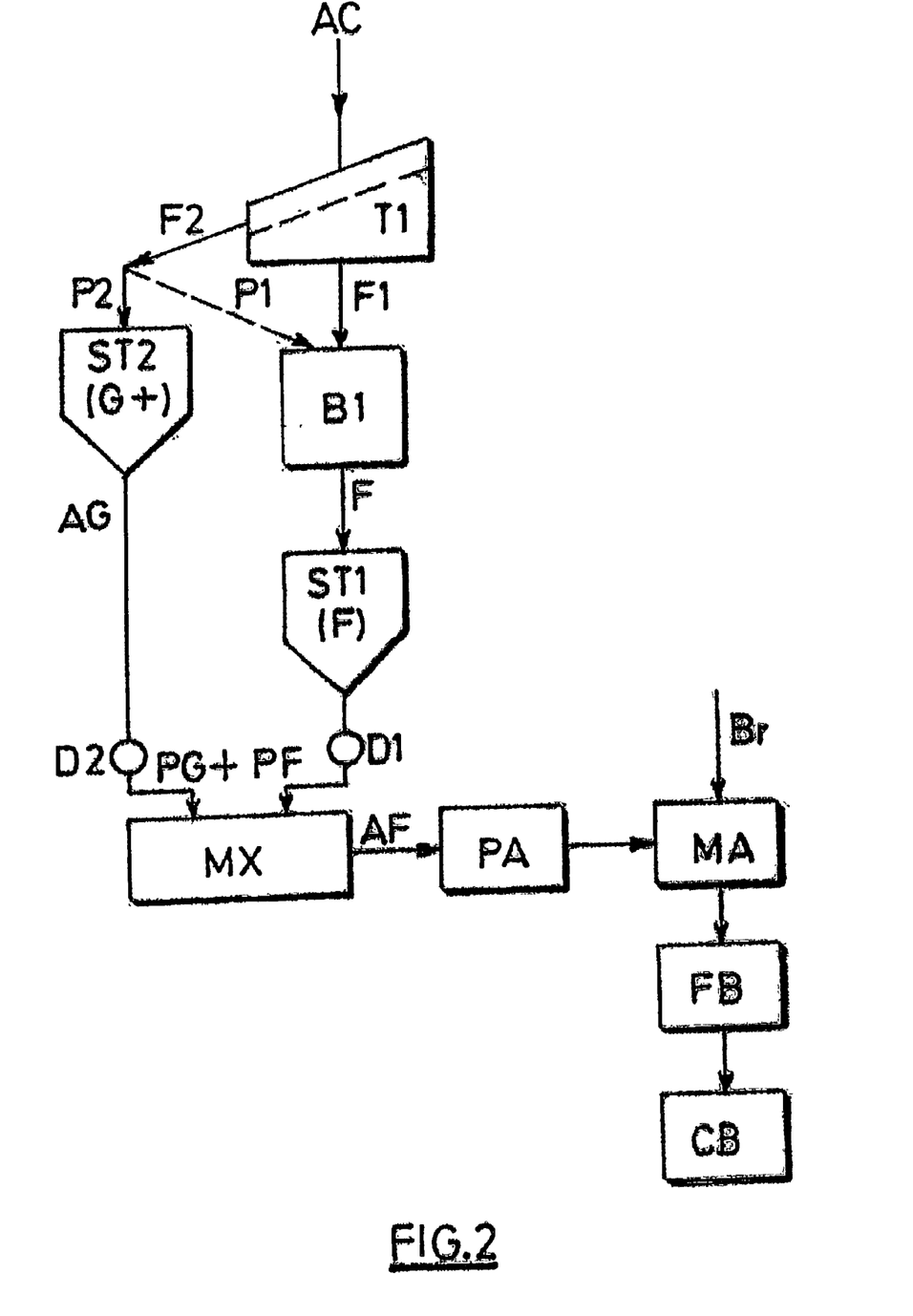
FIG. 2 illustrates the process of the invention.

In the process of the invention, such as illustrated in FIG. 2, the initial carbon aggregate AC is separated, by means of at least one separating means T1, into a first fraction F1 of grain size distribution G−, and into a second fraction F2 of grain size distribution G+. The separating means are typically a screening device or an air-swept dynamic separator.

Said derived part P1 is adjusted in relation to the grain size distribution of the initial carbon aggregate AC. Preferably it is such that only a small part of F2 is crushed, that is to say that a small part P1 of F2 is diverted to be crushed with F1. P1 is preferably less than 20%, and typically between 1% and 10%.

Fraction F1 and diverted part P1 of fraction F2 are then crushed in at least one crushing means B1 so as to obtain a powder F containing a controlled proportion PUF of ultra-fine grains, that is to say grains less than 30 $\mu$m in size. In order to obtain a given flow DF of powder F, irrespective of the grain size distribution of the initial aggregate AC, the diverted part P1 may be adjusted so that the flow DF of powder F leaving the crusher B1 is substantially constant. Flow DF is equal to DF2×P1+DF1, in which DF2 and DF1 are the respective flows of fractions F1 and F2. In practice, parts P1 and P2 may be adjusted so as to maintain flow DF substantially constant. This adjustment may be made using the filling levels of buffer silos ST1 and ST2.

B1 is typically a ball crusher, optionally fitted with a re-circulation circuit comprising an air-swept dynamic selector with which it is possible to adjust grain size distribution and the PUF fraction.

The remaining part P2 of fraction F2 (also called "coarse aggregate" AG) and powder F are then proportioned and combined to re-constitute a carbon aggregate AF (step MX). Said remaining part and said powder F are mixed in respective proportions PG+ and PF with which it is possible to obtain crude carbon blocks having a grain size distribution GF such that the ratio between the proportion PGr of grains larger than 0.3 mm and the proportion PS of grains between 30 mm and 0.3 mm in size is at least equal to 4, and to obtain baked carbon blocks of high density, that is to say a density of preferably greater than 1.55, and further preferably greater than 1.60. The ratio Gr/S is at least equal to 4, preferably greater than 10, and further preferably greater than 15.

In order to facilitate the mixture of the final aggregate with the binder, the final aggregate is generally pre-heated (step PA). In practice, it is advantageous to perform the mixing MX and preheating PA in one same device which may typically be a preheating screw heated with heat transfer fluid. Proportioning of the intermediate aggregates AG and F may be made using proportioners D1 and D2 typically installed at the inlet of the device. With these proportioners which are typically screw or strip dosimeters, it is possible to adjust the flow of intermediate aggregates and consequently the proportions PG+ and PF of these aggregates. The proportion PF determines the proportion of ultrafine grains PUF which, to a large extent, determines the density of the baked carbon blocks.

The final aggregate is mixed with a pitch binder Br and hot mixed to form a homogeneous paste (step MA). Typically, this step is conducted in a mixer, such as a mixer of Buss® or Eirich® type. Mixing temperature preferably ranges from 130° C. to 220° C., and typically from 170° C. to 190° C. Mixing is followed by a forming step FB to form said paste into one or more carbon blocks in the crude state. This forming may be conducted in a vibrocompactor or a press. This last step advantageously comprises a densifying operation by compacting said paste. The crude carbon blocks are then baked at a temperature that is generally higher than 900° C. in a furnace, generally a rotating furnace (step CB).

It is advantageous to store the remaining part P2 and powder F in buffer reserves, such as silos, respectively denoted ST2 and ST1. This buffer storage allows for greater control over the flow of carbon materials.

Figure 3:
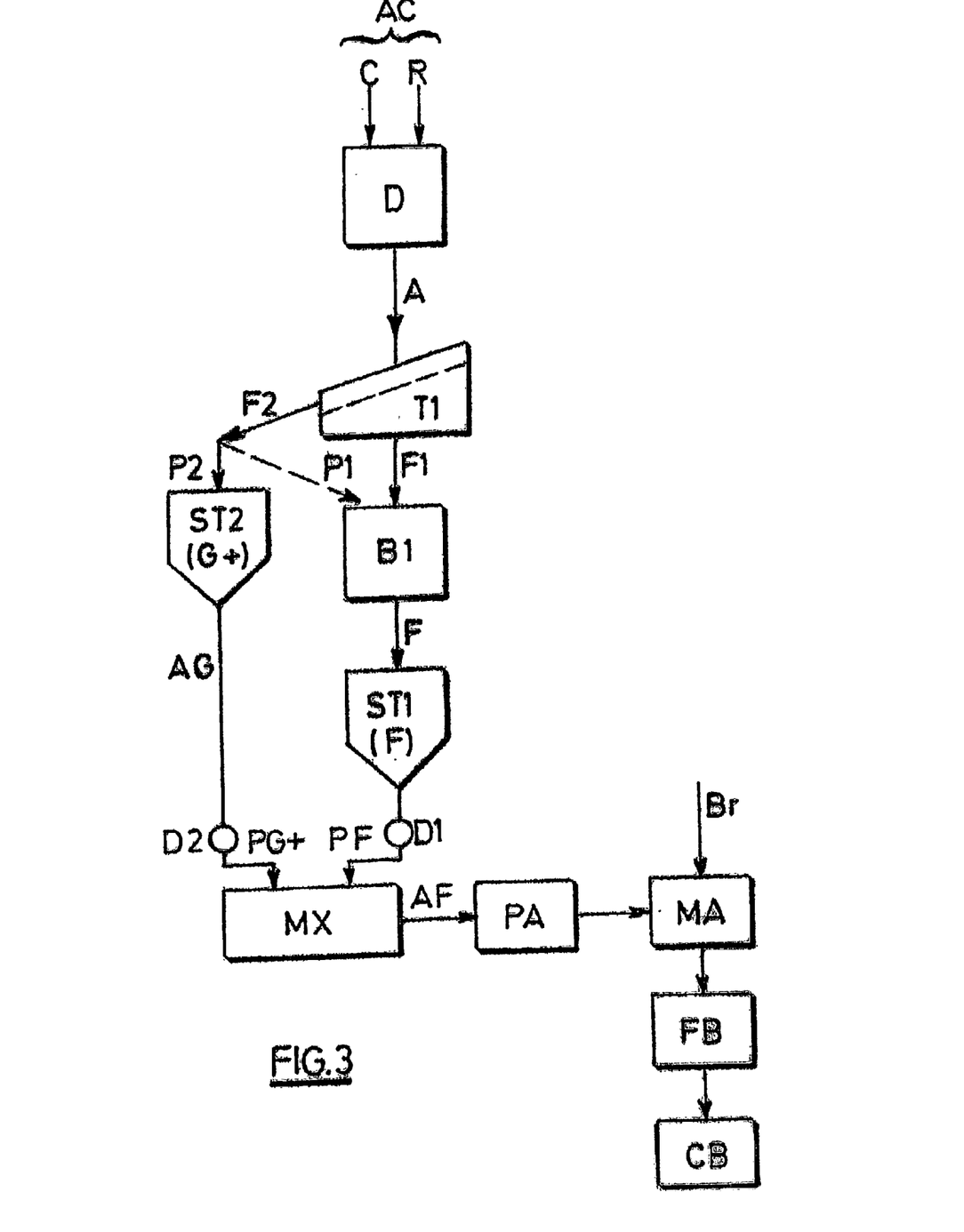

In one preferred embodiment of the invention, illustrated in FIG. 3, the initial carbon aggregate AC undergoes prior treatment D intended to remove the grains whose size is greater than a determined value (or tolerance threshold) Y, which is preferably 20 mm, and further preferably 30 mm. By means of this operation it is possible in particular to avoid damaging certain types of mixers downstream from the process and/or to better control the flow of materials on belt conveyors, screws, vibrators, launders used to transport the grain materials.

Figure 4A:
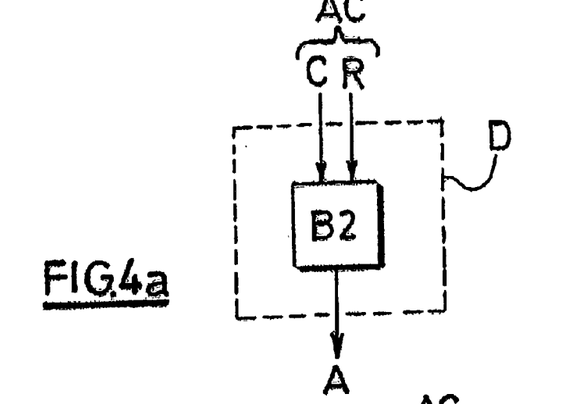
Figure 4B:
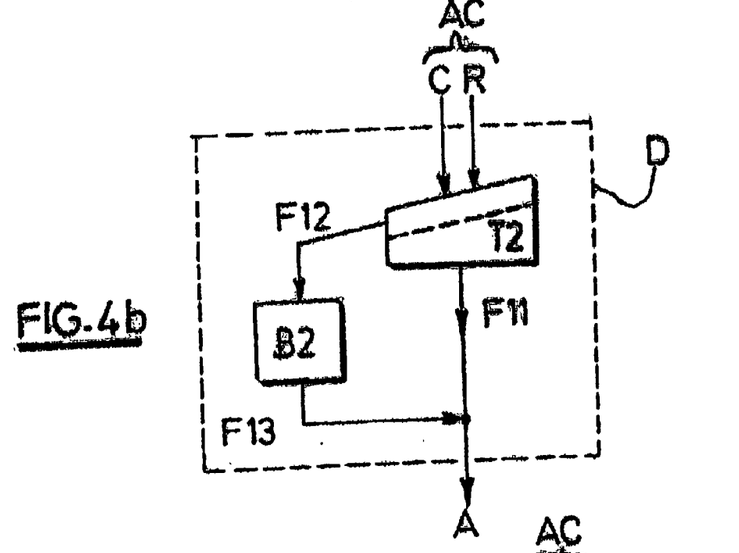
Figure 4C:
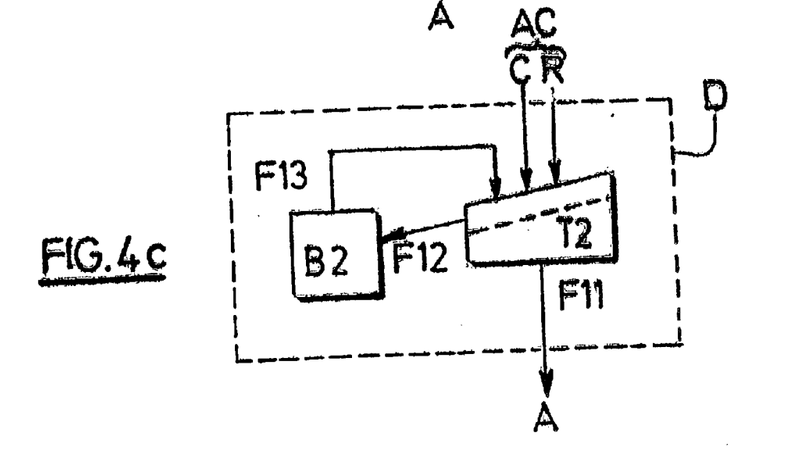

As illustrated in FIGS. 4a to 4c, prior treatment D preferably comprises crushing B2 and optionally a separating operation T2 of the initial carbon aggregate into a fraction F11 only containing grains smaller in size than the tolerance threshold Y and into a fraction F12 made up of grains at and over the threshold size. The separating operation T2, which therefore concerns the grains whose size is greater than Y, makes it possible to increase the efficiency and productivity of crushing operation B2. Crusher B2 is advantageously a grinder for material bed grinding under pressure, such as a Rhodax® cone vibrating crusher made by FCB, or a roll crusher which avoids having recourse to the separating operation T2 (FIG. 4a).

In the variant illustrated in FIG. 4b, the carbon aggregate A derived from step D, which is treated in the subsequent steps of the process of the invention, is made up of the crushed aggregate F13, derived from crushing operation B2, and optionally also of fraction F11. The prior step D with no separating operation T2 (FIG. 4a) may for example be conducted using an open-circuit compression crusher or an open-circuit material bed under-pressure grinder which is able to crush the very large grains efficiently without producing substantial quantities of sand, fines or ultra-fines, that is to say without changing the ratio between the proportion of grains Gr and grains S in unacceptable manner.

In the variant illustrated in FIG. 4c, the aggregate F13 derived from crusher B2 is re-added to the separating means T2.

Figure 5:
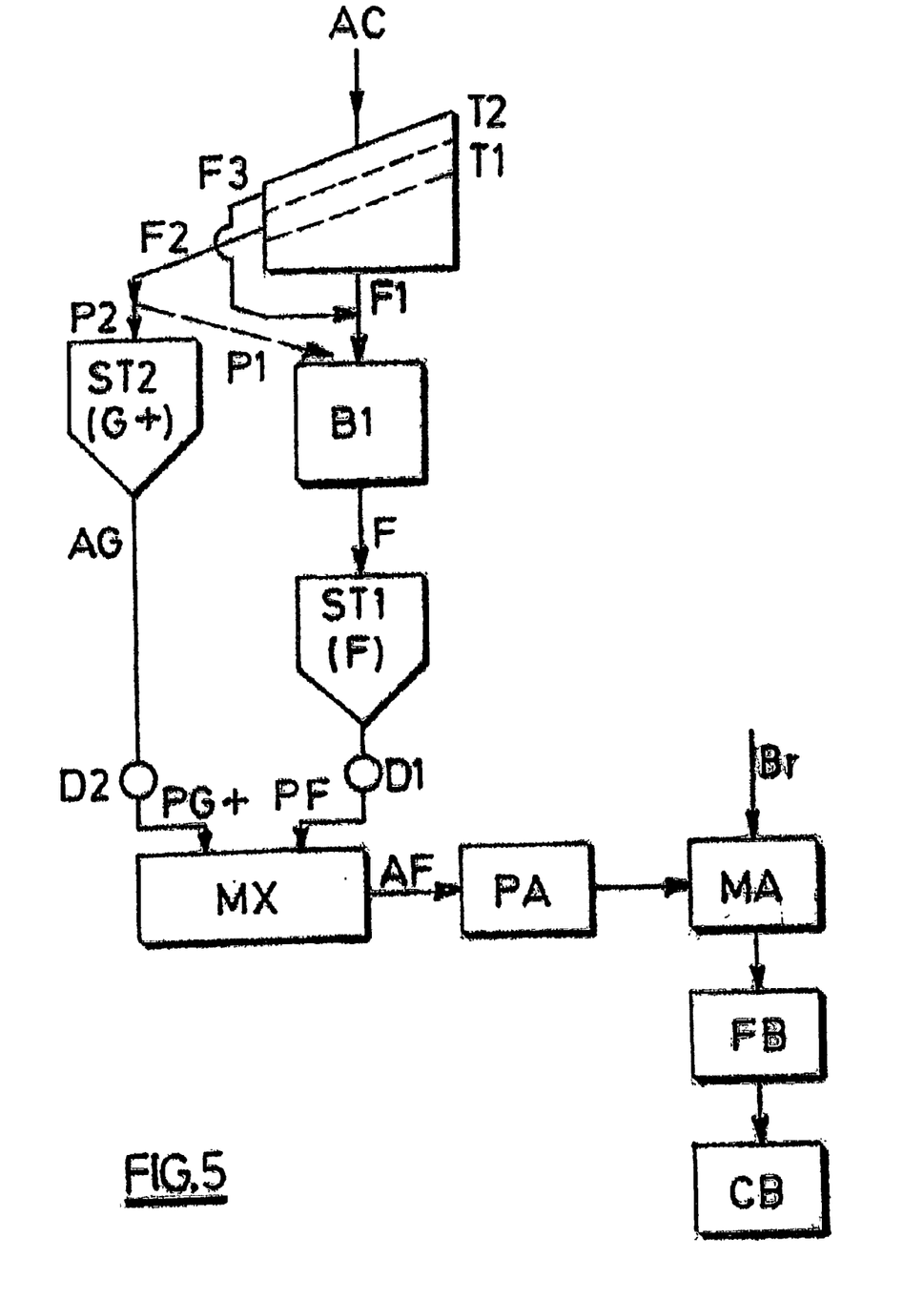

According to the embodiment of the invention illustrated in FIG. 5, the process also comprises a prior separating step T2 of the initial carbon aggregate AC, which allows removal of those grains whose size is greater than Y (flow F3), and the mixing of these grains with fraction F1 before or during said crushing operation B1 of fraction F1. In practice, a separating means T2 may be associated with separating means T1 in order to remove the large-size grains from the initial carbon aggregate and add them to crusher B1. This variant offers the advantage of removing grains larger than Y at least cost, since in this case only a single separating means and a single crusher are required.

Figure 6:
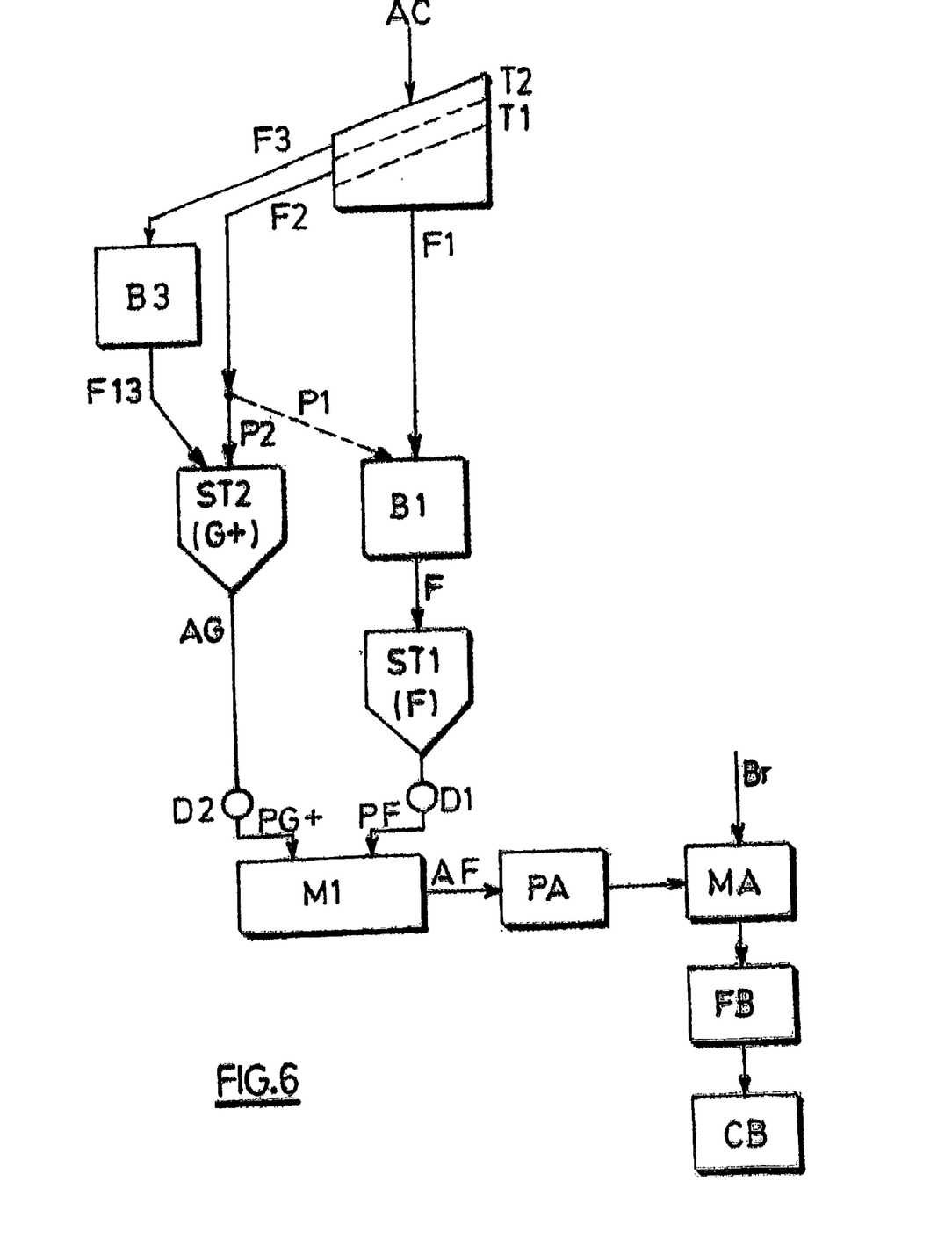

According to the variant of the invention shown in FIG. 6, the process also comprises an additional separating step T2 of the initial carbon aggregate AC which allows removal of grains larger than Y (flow F3), their crushing B3, and mixing of the crushed product obtained F13 with said second part P2 in such manner as to limit the proportion of these grains in part P2 of grain size distribution G+. Crusher B3 is preferably an material bed under-pressure grinder. This variant has the advantage of using a low-capacity crusher since the quantity of grains larger than Y remains low in AC. This variant also offers the advantage of making it possible to group together the separating means T1 and T2.

The process of the invention is intended in particular for the production of carbon anodes used for the production of aluminium based on the Hall-Héroult process, and enables the complete process to be simplified and to reduce production costs.

The carbon anodes obtained with the process of the invention may advantageously be used for a primary aluminium production process based on the Hall-Héroult electrolysis process on account of the high thermal shock resistance of the anodes.

EXAMPLES

Tests were conducted using the process of the invention according to the embodiment shown in FIGS. 3 and 4a. Crusher B2 was a Rhodax® crusher.

The carbon aggregate was made up of an ungraded mixture of 70% coke and 30% recycled material. The recycled material was derived from spent electrolysis cell anodes. The average grain size distribution of the carbon aggregate and its constituents, obtained over a one-week production period of aluminium electrolysis anodes (corresponding to the production or approximately 3000 anodes) is given in Table 1.

The grain size distribution of the pre-crushed aggregate A derived from prior treatment step D is also given in Table 1. It shows that this step enables the efficient removal of grains larger than 30 mm in size.

TABLE 1

|  | <30 µm | 30 µm to 300 µm | 300 µm to 30 mm | >30 mm | Gr/S |
|---|---|---|---|---|---|
| Coke C | 0.1 | 12.3 | 87.6 | 0.0 | 7.1 |
| Recycled mat. R | 0.0 | 7.0 | 91.0 | 2.0 | 13.3 |
| Initial carbon aggregate AC | 0.1 | 10.8 | 88.5 | 0.6 | 8.3 |
| Pre- | 0.1 | 12.0 | 87.9 | 0.0 | 7.3 |

TABLE 1-continued

|  | <30 μm | 30 μm to 300 μm | 300 μm to 30 mm | >30 mm | Gr/S |
|---|---|---|---|---|---|
| crushed aggregate A |  |  |  |  |  |

The pre-crushed aggregate A was then separated into two fractions F1 and F2 by means of a screen fitted with square-mesh sheeting. The sorting threshold X between these two fractions was 1 mm. On average, 88% of the pre-crushed aggregate A passed to side F2 and 12% passed to side F1. P1 was equal to 5% which means that fraction F1 and 5% of F2 were then entirely crushed in B1 which was a ball crusher, in order to obtain a powder of fines F. An aggregate was then re-constituted by mixing part P2 (grain size distribution G+) and fines F in the following proportions: PG+=84% of P2 (corresponding to 88% of A less the 5% of F2 diverted towards crusher B1) and PF=16% of F (corresponding to 12% of A plus the 5% of F2). The grain size distribution of fractions F2 and F1, of fines F and of the reconstituted aggregate at level M1 is given in Table 2.

The Gr/S ratio of the carbon aggregate entering the paste unit, that is to say upstream from the process, was therefore much lower than the Gr/S ratio of the reconstituted aggregate (namely 8.3 compared with 21.4). The prior treatment step D (pre-crushing) made it possible to remove the large grains while only reducing the Gr/S very slightly (namely 8.3 on entering the crusher, and 7.3 after pre-crushing).

TABLE 2

|  | <30 μm | 30 μm to 300 μm | 300 μm to 30 mm | >30 mm | Gr/S |
|---|---|---|---|---|---|
| Fraction F2 (grain size distribution G+) | 0.1 | 1.6 | 98.3 | 0.0 | 64.3 |
| Fraction F1 (grain size distribution G−) | 0.1 | 88.9 | 11.0 | 0.0 | 0.1 |
| Fines F | 85.0 | 15.0 | 0.0 | 0.0 | 0.0 |
| Reconstituted | 14.5 | 3.8 | 81.7 | 0.0 | 21.4 |

The reconstituted carbon aggregate was mixed with petroleum pitch, then hot mixed using a mixer so as to form a homogeneous paste. This paste was then formed into crude carbon anodes which were subsequently baked in a ring furnace. The average geometrical density, after baking, of the anodes obtained according to the process of the invention was 1.580 with a standard deviation of 0.015.

The anodes obtained were used in electrolysis cells for the production of aluminium using the Hall-Héroult process. None of the anodes produced broke under thermal shock in the electrolysis cells in which they were used.

ADVANTAGES OF THE INVENTION

Through the simplicity of the process it is possible to limit investment and maintenance costs, and also the risk of breakdowns since less electromechanical and mechanical equipment is required. In particular, the reduced number of proportioners substantially limits the risks of equipment breakdown.

What is claimed is:

1. Process for producing carbon blocks, comprising the steps of:
    a) obtaining an initial carbon aggregate and adjusting grain size distribution of the initial carbon aggregate by separating the initial carbon aggregate into a first fraction having a first size distribution and made up of grains smaller than a predetermined size X and a second fraction having a second size distribution and made up of grains larger than or equal to said predetermined size X, where X is between 0.2 and 2 mm;
    b) crushing the first fraction and a diverted part of the second fraction to obtain a powder containing a controlled proportion of ultra-fine grains having a size smaller than 30 μm;
    c) mixing the part of the second fraction which was not diverted and said powder in predetermined proportions;
    d) hot mixing the mixed carbon aggregate with a predetermined quantity of pitch binder to form a homogeneous paste;
    e) forming the paste to form at least one crude carbon block, wherein said predetermined proportions result in formation of at least one crude carbon block having a grain size distribution such that a ratio between a proportion Gr of grains larger than 0.3 mm and a proportion S of grains between 30 μm and 0.3 mm in size, Gr/S, is at least equal to 4; and
    f) baking the at least one crude carbon block to produce said carbon block having a density greater than 1.55.

2. Process according to claim 1, wherein X is between 0.3 and 1 mm.

3. Process according to claim 1, wherein said initial carbon aggregate is ungraded aggregate.

4. Process according to claim 1, wherein the diverted part and the part which was not diverted are adjusted so as to maintain a substantially constant flow of powder leaving said crushing.

5. Process according to claim 1, wherein the initial aggregate contains calcined petroleum coke having a percentage of grains smaller than 0.3 mm of no more than 35%.

6. Process according to claim 5, wherein the percentage is 10% or less.

7. Process according to claim 1, wherein said initial aggregate contains up to 40% of recycled carbon products.

8. Process according to claim 1, wherein the crushing step is conducted by means of a ball crusher optionally fitted with a re-circulation circuit comprising an air swept dynamic separator enabling adjustment of grain size distribution and of the proportion of ultra-fine grains.

9. Process according to claim 1, wherein the diverted part is less than 20%.

10. Process according to claim 1, wherein the proportion of ultra-fine grains is greater than 70%.

11. Process according to claim 1, wherein the ratio is greater than 10.

12. Process according to claim 1, additionally comprising a prior treatment operation of the initial aggregate to obtain an aggregate in which all grains have a size no greater than a predetermined value Y.

13. Process according to claim 12, wherein said prior treatment comprises crushing by material bed grinding under pressure.

14. Process according to claim 13, wherein the material bed grinding is carried out using a cone vibrating crusher.

15. Process according to claim 13, wherein grains greater in size than the predetermined value Y are separated and treated by said crushing by material bed grinding.

16. Process according to claim 12, wherein grains greater in size than the predetermined value Y are separated and mixed with grains of said first fraction before or during said crushing of the grains of the first fraction.

17. Process according to claim 13, wherein grains greater in size than the predetermined value Y are separated and crushed, and the crushed grains obtained thereby are mixed with the part which was not diverted.

18. Process according to claim 12, wherein Y is 20 mm.
19. Process according to claim 15, wherein Y is 20 mm.
20. Process according to claim 16, wherein Y is 20 mm.
21. Process according to claim 17, wherein Y is 20 mm.
22. Process according to claim 1, wherein the carbon blocks are anodes for production of aluminum.

* * * * *

UNITED STATES PATENT AND TRADEMARK OFFICE
CERTIFICATE OF CORRECTION

PATENT NO.   : 6,838,024 B1
DATED        : January 4, 2005
INVENTOR(S)  : Christian Dreyer et al.

It is certified that error appears in the above-identified patent and that said Letters Patent is hereby corrected as shown below:

Column 3,
Line 27, change "30 mm" to -- 30 $\mu$m --;

Column 4,
Line 59, change "30 mm" to -- 30 $\mu$m --.

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,838,024 B1
DATED : January 4, 2005
INVENTOR(S) : Christian Dreyer et al.

It is certified that error appears in the above-identified patent and that said Letters Patent is hereby corrected as shown below:

Column 3,
Line 27, change "30 mm" to -- 30 $\mu$m --;

Column 4,
Line 59, change "30 mm" to -- 30 $\mu$m --.

Signed and Sealed this

Thirty-first Day of May, 2005

JON W. DUDAS
*Director of the United States Patent and Trademark Office*